United States Patent [19]

Baker et al.

[11] 4,281,594

[45] Aug. 4, 1981

[54] BUN SECTION TOASTER

[75] Inventors: Edward D. Baker, San Francisco; Nils Lang-Ree, Los Altos, both of Calif.

[73] Assignee: NPI Corporation, Burlingame, Calif.

[21] Appl. No.: 61,055

[22] Filed: Jul. 26, 1979

[51] Int. Cl.³ .............................................. A47J 37/08
[52] U.S. Cl. ........................................ 99/386; 99/391; 99/401; 99/443 C; 99/450; 198/474
[58] Field of Search ................. 99/386, 401, 389, 391, 99/392, 443 C, 450, 393, 388, 427, 423, 349; 198/474

[56] References Cited

U.S. PATENT DOCUMENTS

| 2,453,385 | 11/1948 | Rone | 99/423 |
|---|---|---|---|
| 3,693,452 | 9/1972 | McGinley | 99/391 |
| 3,889,582 | 6/1975 | Binks | 99/450 |
| 3,941,044 | 3/1976 | Goltsos | 99/391 |
| 4,184,421 | 1/1980 | Ahlgren | 99/450 |

FOREIGN PATENT DOCUMENTS 942588  2/1974  Canada ...................................... 99/427

Primary Examiner—Billy J. Wilhite
Attorney, Agent, or Firm—Lothrop & West

[57] ABSTRACT

A bun section toaster, in the usual case, has a frame supporting several parallel chain conveyors, each conveyor being effective to advance a related bun section through the frame in physical and thermal contact with a heating element on the frame to toast the top of the adjacent bun section. At least one of the conveyors, especially for a bun section from the bun center, receives and advances a tray having an aperture over which the bun center section lies. A radiant heating element on the frame is in position to radiate upwardly through the aperture onto the bottom of the center bun section so both sides of the section are toasted simultaneously. In the usual case, the toaster simultaneously accommodates a bun top section, center section and bottom section, although in some instances there is but a single conveyor and but the center section is handled.

4 Claims, 6 Drawing Figures

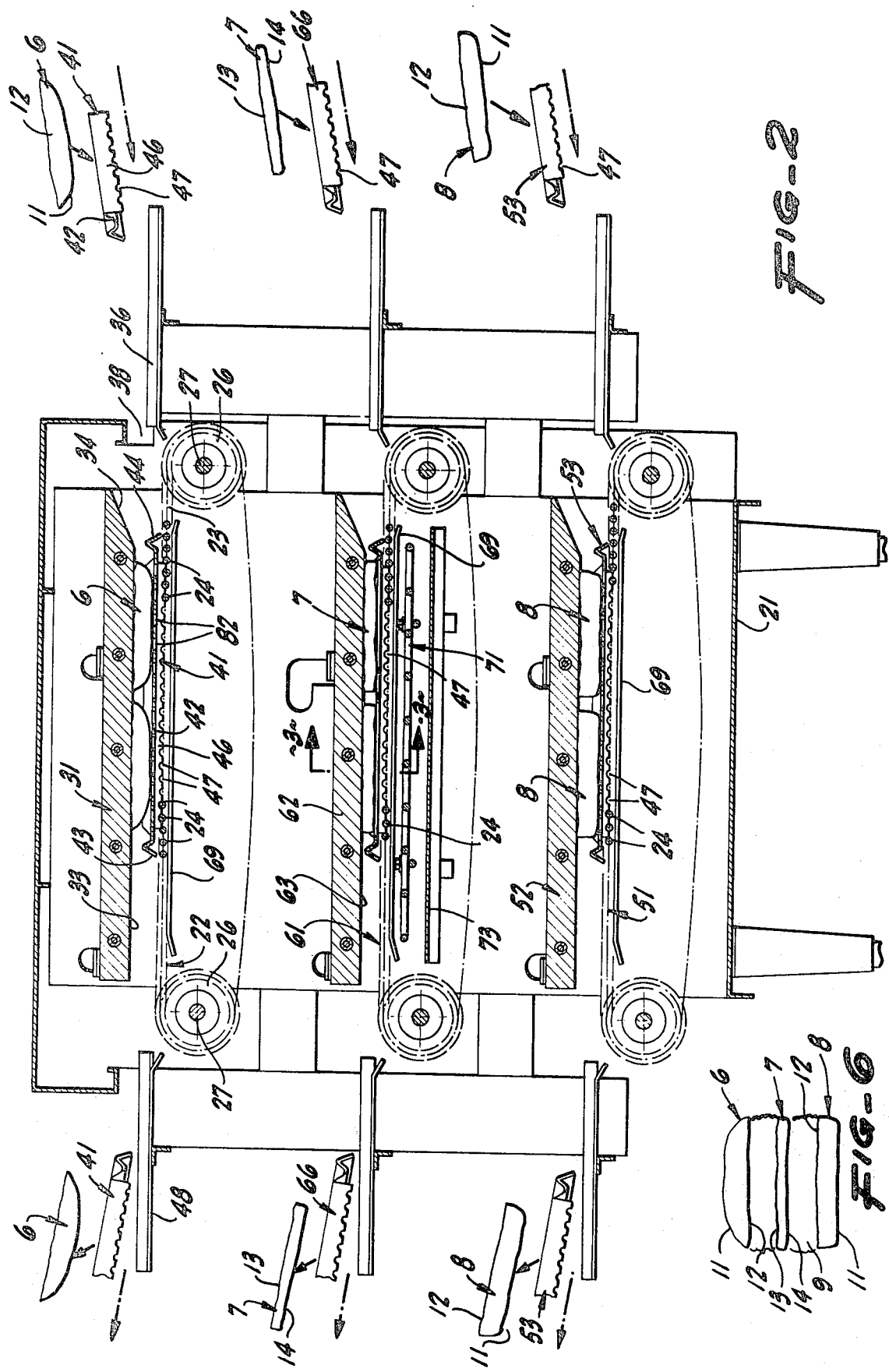

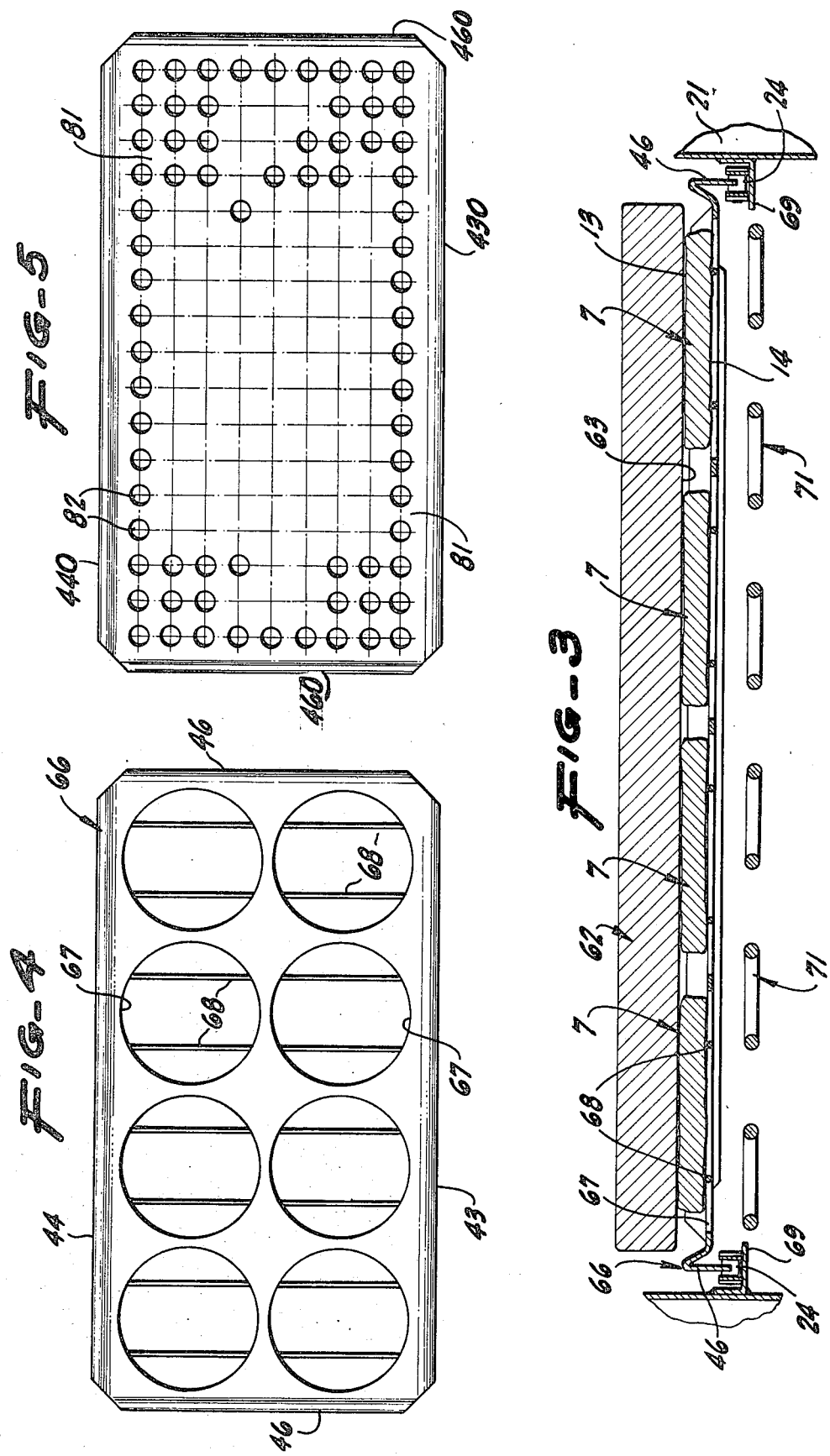

BUN SECTION TOASTER

BRIEF SUMMARY OF THE INVENTION

It is now customary, particularly in connection with furnishing hamburger edibles, to slice the accompanying bun into a top section, a center section and a bottom section. The thin center section has two cut surfaces and is difficult to handle because of its general compressibility and flexibility. According to the present invention, the center section is handled on a tray having an aperture in it over which the center section can lie, being appropriately supported. The top section and the bottom section go through the machine simultaneously on their individual conveyors, while the center section tray simultaneously goes through the machine. The center section is toasted on the top by a regular contact heating element, but the bottom of the center section is toasted through the aperture by radiant energy from a radiant heater disposed in close proximity below but out of physical contact with the bun or bun tray. The net result is satisfactorily to produce the three bun sections toasted on all of their cut faces.

BRIEF DESCRIPTION OF THE SEVERAL VIEWS OF THE DRAWINGS

FIG. 2 is a cross-section, the plane of which is indicated by the line 2—2 of FIG. 1.

FIG. 3 is a cross-section, the plane of which is indicated by the line 3—3 of FIG. 2.

FIG. 4 is a plan of one form of tray useful in connection with the center bun section.

FIG. 5 is a plan of another form of tray useful in connection with the center bun section.

FIG. 6 is a side elevation of a customary hamburger patty including a bun having top, center and bottom sections.

DETAILED DESCRIPTION

Figure 1:
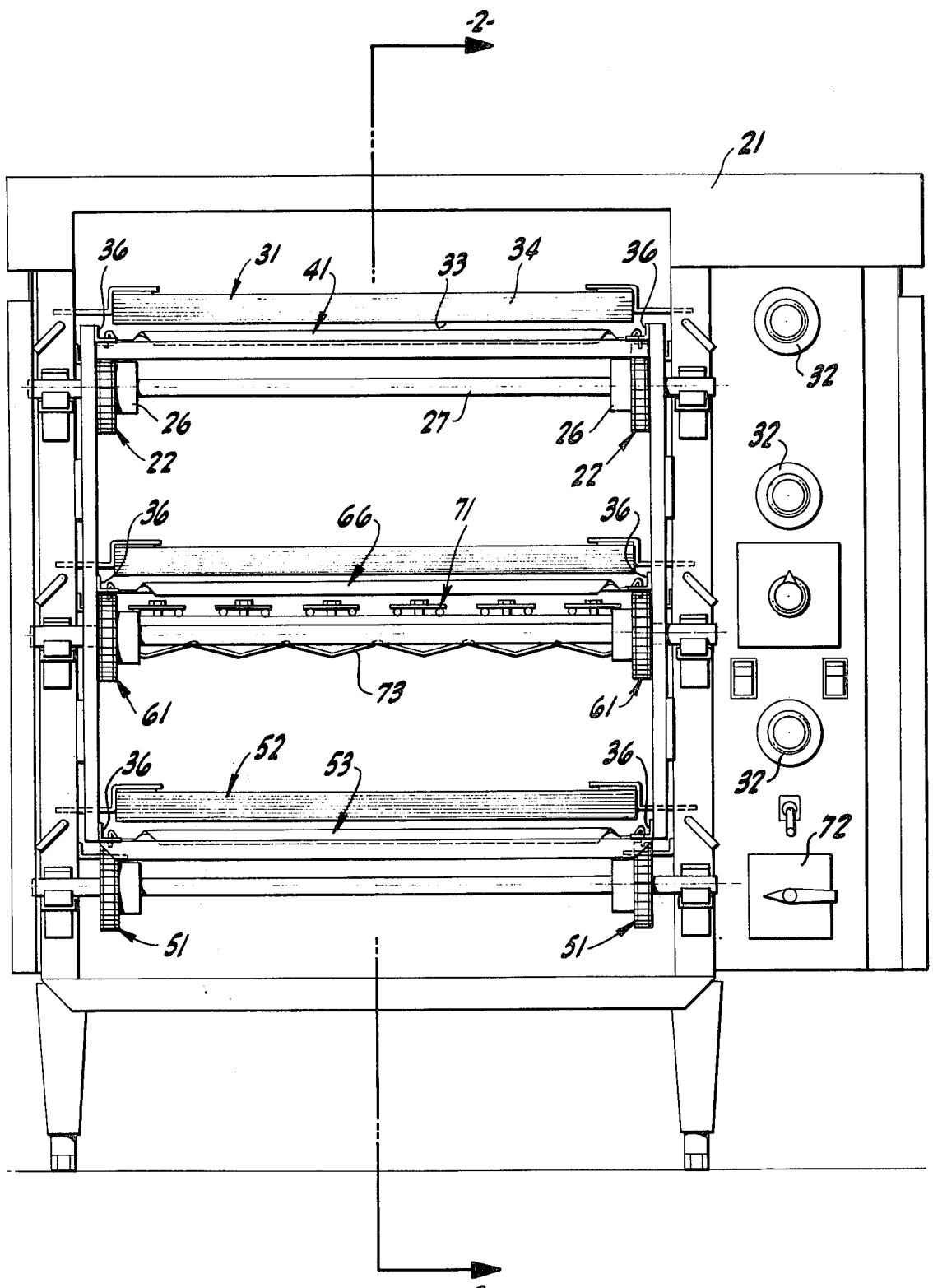
FIG. 1 is a front elevation of a bun section toaster constructed pursuant to the present disclosure.

The showing in FIG. 6 indicates a finished hamburger patty product inclusive of a bun section top 6, a bun center section 7 and a bun bottom section 8 between which various edible materials 9 are interposed. The sections 6, 7 and 8 in plan are generally circular and vary somewhat in thickness as shown. The top and bottom sections each have a baked outer surface 11 and a cut inner surface 12. The inner or center section 7, however, while it has a baked outer rim, has both a cut top surface 13 and a cut bottom surface 14.

A machine for toasting the various bun section surfaces includes a main frame 21 near the upper portion of which there is provided a first conveyor 22 having a couple of side chains 23 having the usual chain pin joints 24 trained around sprocket pulleys 26 on appropriate shafts 27 journalled on the frame 21 and driven as desired, preferably at a predetermined speed with the top run going from right to left as seen in FIG. 2. Each of the chains is made up in the customary fashion of a number of links having chain joints 29 therebetween, the joints being generally circular-cylindrical or pin-like. This is standard link chain.

Located on the frame just above the upper run of the conveyor 22 is an upper contact heating element 31 appropriately connected into an electric circuit usually having a thermostat controller 32 (FIG. 1) and arranged so that the heating element lower surface 33, which is planar and quite smooth, is heated to and maintained at a predetermined or preselected temperature level. The contact heating element 31 has a beveled lead-in surface 34 and is located adjacent a feeding ramp 36 extending outwardly from the machine frame 21 to a convenient location and extending to a feeding opening 38. This opening is of a size and disposition readily to receive a bun top tray 41.

A typical bun top tray usually includes a solid metal sheet 42 having upstanding and inclined leading and trailing edges 43 and 44 as well as upstanding and downturned lateral edges 46 along both sides. Each of the downturned side edges 46 extends downwardly far enough so as to carry readily a number of scallops 47 or notches of a size and location readily to interfit with and releasably engage the chain joints 24. The tray preferably is somewhat recessed, as seen from above, and is of a size normally to accommodate a number of bun tops 6 resting on the tray with the cut surface 12 uppermost and exposed.

In the operation of this structure, when the contact heating element 31 is appropriately energized and has come up to temperature as set by the thermostat 32, an attendant can feed through the aperture 38 a tray 41 containing a number of bun tops in the positions illustrated. The feeding is sufficiently exact so that the tray scallops 47 or notches interengage with the chain joints. The tray and the conveyor are thus interrelated. The effect is to move the tray and its contained buns through the frame of the machine with the upper, bun top surface 12 in physical contact with the heated under surface 33 of the heater element 31. The timing is such that the bun tops, entering the heater in normal state, emerge therefrom with their tray 41 onto a receiving platform 48 on the frame, with the upper surface 12 of the proper toasted character. An attendant then removes the tray 41 from the discharge station and puts the toasted bun tops into use.

In a related fashion, there is also provided on the frame 21 a similar bottom conveyor 51 and a similar heating element 52. These are not described in detail since they are virtually identical with the first, top conveyor 22 and the heating element 31 just described and similarly handled. The accompanying tray 53, identical to the tray 41, has arranged on it a number of bun bottom sections 8 disposed with the cut surface 12 uppermost. The bottom section 8 goes through the frame on the lowermost conveyor 51 in precisely the same fashion as does the uppermost bun section 6, the speed of advance being usually about the same. In fact, in many instances the two conveyors 22 and 51 are driven simultaneously. The result is presentation at the bottom section of the machine of a tray carrying bun bottoms 8 all properly toasted on the exposed surfaces 12. The discharged tray 53 and buns are removed manually, as previously described.

Particularly in accordance with the present invention, also on the main frame 21 there is a third conveyor 61. In general this is just like the conveyors 22 and 51. The conveyor 61 is disposed on the frame parallel to and intermediate the upper and lower conveyors and is similarly controlled and driven. The conveyor 61 in its upper run is subjacent to an intermediate heating element 62. This is virtually the same as the elements 31 and 52. The lower surface 63 of the element 62 is a contact toaster for the upper surface 13 of the intemediate or center section 7 of the bun.

There is some departure in toasting technique at this point because of the relatively fragile nature of the relatively thin center section 7. As particularly shown in FIG. 3, the center section is adapted to be received on a tray 66 (FIG. 4) formed very much like the other trays 41 and 53 except that the central section is pierced to provide a number of apertures 67. Since the buns are usually circular in plan, the apertures 67 are likewise usually circular in plan, although they can be of any configuration that is desired. The diameter of each of the apertures 67 is substantially that of the customary or standard bun center section 7 or may be slightly smaller. Preferably each aperture 67 is made at least as large as, and perhaps a little bit larger than, the standard center section 7. In addition, there may be provided extra supporting means. In this instance, such supporting means take the form of cross bars 68 spanning the aperture and firmly secured to the tray. In some instances, the cross bars 68 can take on arbitrary configurations so as to support the center sections in any manner particularly desired and so as to leave less-toasted marks on the center section bottom.

With this arrangement, the center sections 7 are disposed on the related tray 66 in general registry with the various apertures 67 therein. When the loaded tray is started through the machine, the chain pins are similarly engaged with the scallops 47, and the tray is advanced from right to left, as seen in FIG. 2. In this case, the upper surface 13 of the center section is in physical contact with the heating member 62. As with the other conveyors also, the upper run of the chain is sufficiently taut or is especially positioned by a nether guide 69 or runner so that very firm contact is maintained between the upper surface 13 and the lower heater surface 63.

In addition, the frame 21 carries a special heater 71. Although supplied from the same electrical source as the heaters 31 and 52, and although having its own controller 72, if desired, the heater 71 is not of the contact variety. Rather, it is a radiant heater. The heat energy from the heater 71 radiates in all directions and is particularly reflected upwardly by an interposed sheet 73 of bright metal. Virtually all of the initially downward radiant emanation from the heater 71 is deflected and directed upwardly. The radiation then is upon the lower surface 14 of the center section 7 through the various apertures 67.

In this way, both surfaces of the center bun section are simultaneously toasted to substantially the same extent, the effect of the radiant heater 71 and the effect of the contact heater 62 being closely adjusted or balanced to that end. The speed of the conveyor 61 is preferably substantially the same as that of the other conveyors. The similarly fed and timed center section tray is discharged from the machine, in the previously described fashion, so that an operator has presented to him simultaneously a number of bun top sections, bun center sections and bun bottom sections, all of which have had their cut surfaces toasted to substantially the same extent.

The bun sections so treated and prepared are utilized in the customary fashion.

In some instances, particularly with objects which may not be of the customary shape or size of a hamburger bun, the tray as shown in FIG. 4 can be replaced by a slightly different form of tray 81 as shown in FIG. 5. This tray is about the same in exterior configuration and in cross-section as the tray 66, but in this instance instead of having apertures 67 of substantially the same diameter as that of a bun is instead provided with a number of openings 82 of any selected size and in any desired configuration and location in order that the desired part of the superposed material can be subjected to radiation from the heater 71 as the tray passes through the machine. The tray 81 has upstanding and inclined leading and trailing edges 430 and 440 as well as upstanding and downturned lateral edge 460 along both sides.

We claim:

1. A toaster for a bun center section having substantially planar and parallel upper and lower surfaces, said toaster comprising:
   a. a frame;
   b. a conveyor on said frame;
   c. a tray having an aperture therein and adapted to receive the lower surface of a bun center section overlying said aperture;
   d. means including said conveyor for advancing said tray across said frame substantially in a horizontal position;
   e. a contact heater mounted on said frame, said contact heater including a substantially horizontal planar lower surface vertically spaced above said tray to engage the entire upper surface of said bun center section in firm contact to impart heat to said upper surface of said bun center section as said tray advances across said frame;
   f. a radiant heater mounted on said frame in close proximity below but out of physical contact with said tray to impart heat upwardly through said aperture to said lower surface of said bun center section as said tray advances across said frame; and,
   g. regulating means for energizing said contact heater and said radiant heater to toast said upper surface of said bun center section and said lower surface of said bun center section substantially equally.

2. A bun section toaster as in claim 1 in which said conveyor includes a pair of parallel chain runs each including a plurality of evenly spaced chain pins and disposed on said frame with said chain runs parallel to each other in the same plane and with said chain pins in transverse alignment; and in which said tray includes a central plate with said aperture and with parallel lateral side edges formed with evenly spaced notches for driving interengagement with said chain pins.

3. A bun section toaster as in claim 2 including a pair of runners on said frame underlying said chain runs in supporting relation thereto in order to maintain consistent firm contact between said upper surface of said bun center section and said lower surface of said contact heater.

4. A bun section toaster as in claim 3 further including a sheet of bright metal mounted on said frame and located below said radiant heater to reflect and direct upwardly radiant energy initially emanating downwardly from said radiant heater.

* * * * *